United States Patent [19]

Ayres et al.

[11] 3,894,950

[45] July 15, 1975

[54] SERUM SEPARATOR IMPROVEMENT WITH STRETCHABLE FILTER DIAPHRAGM

[75] Inventors: Waldemar A. Ayres, Rutherford; Donald A. Kay, West Milford, both of N.J.

[73] Assignee: Becton, Dickinson and Company, East Rutherford, N.J.

[22] Filed: Feb. 27, 1974

[21] Appl. No.: 446,354

[52] U.S. Cl. ............... 210/131; 210/356; 210/516; 210/DIG. 23
[51] Int. Cl. ............................................. B01d 21/26
[58] Field of Search ....... 23/230 B, 258.5, 259, 292; 128/2 F, 214 R, 218 M, 272; 210/83, 84, 131, 359, 400, 514–518, DIG. 23, DIG. 24, 356; 233/1 A, 1 R, 26

[56] References Cited
UNITED STATES PATENTS

| | | | |
|---|---|---|---|
| 2,220,985 | 11/1940 | Wilson | 210/400 X |
| 2,577,780 | 12/1951 | Lockhart | 128/272 X |
| 3,779,383 | 12/1973 | Ayres | 210/DIG. 23 |
| 3,814,248 | 6/1974 | Lawhead | 210/DIG. 23 |

*Primary Examiner*—Frank A. Spear, Jr.
*Assistant Examiner*—Robert G. Mukai
*Attorney, Agent, or Firm*—Kane, Dalsimer, Kane, Sullivan and Kurucz

[57] ABSTRACT

A self-contained fluid separator assembly is disclosed capable of separating blood into its component parts of plasma or serum, the light phase, and the cellular portion, the heavy phase. The assembly comprises a container having at least one open end for receiving blood for subsequent separation and a closure sealing the open end of the container, the closure being formed of a self-sealing elastomeric material which is penetrable by a pointed hollow needle through which the blood to be separated is conducted into the container. A piston is slidably disposed in the container with the piston outer surfaces in sealing contact with the inner side wall of the container. Pressure responsive valvelike filter means of microporous rubber is provided on the piston the filter being normally closed, and it serves as a barrier when there is a minimum pressure differential on each side of the piston. However, the pores of the filter automatically open larger in response to a substantial fluid pressure differential. When the container is at first subjected to moderate centrifugal force, the blood separates into its light phase and heavy phase. Then the assembly is spun at increased speed and the filter pores automatically stretch open to larger size. Then the light phase passes through the filter providing a filtering action at this stage and the piston moves down through the light phase while retaining sealing engagement with the inner wall surface of the container. Positive stop means is provided on the container between its ends so that the piston as it moves through the light phase will contact the stop means and stop at a predetermined distance above the closure bottom of the container whereupon the pressure differential is terminated and the diaphragm automatically closes off fluid flow to provide a barrier between the separated light and heavy phases of the blood.

2 Claims, 2 Drawing Figures

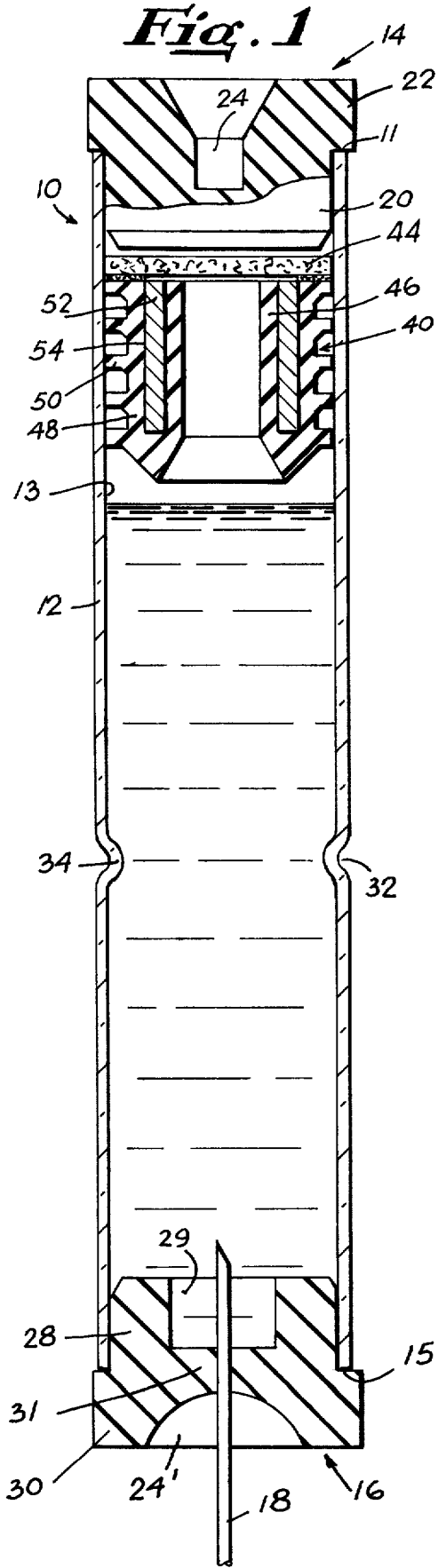
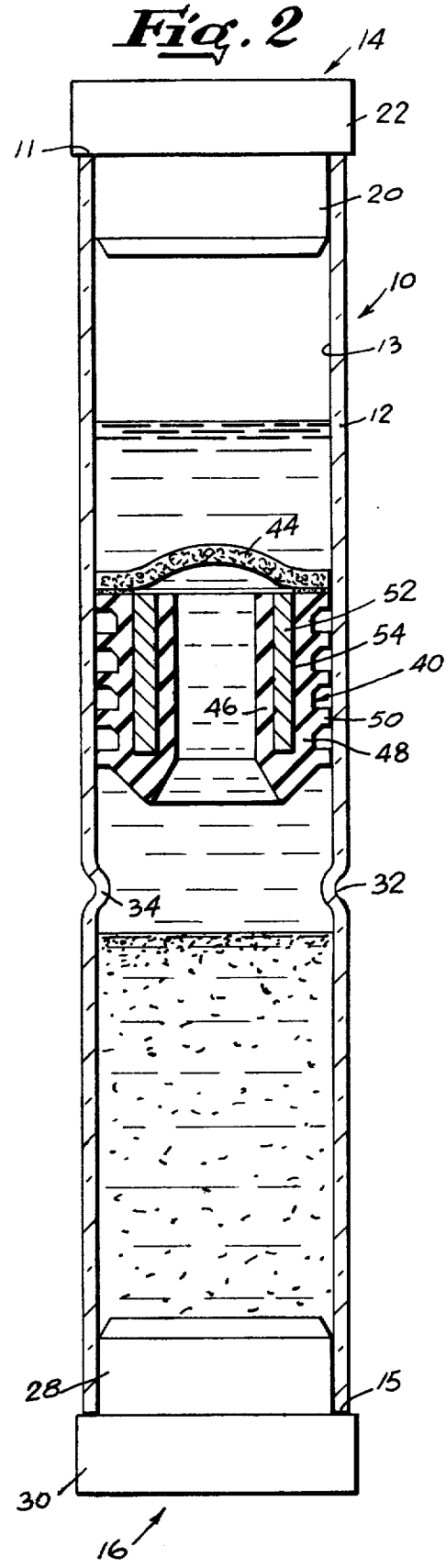

SERUM SEPARATOR IMPROVEMENT WITH STRETCHABLE FILTER DIAPHRAGM

BACKGROUND OF THE INVENTION

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

SUMMARY OF THE INVENTION

The invention generally contemplates the provision of an improved self-contained sealed fluid separator assembly capable of separating blood into its component parts of plasma or serum as the light phase and the cellular portion as the heavy phase and establishing a sealing barrier therebetween without the necessity of opening the container.

It is an object of the invention to automatically separate blood into its component phases by simply subjecting the self-contained assembly to centrifugal force so that upon completion of the centrifuging operation a sealing barrier separates the light phase from the heavy phase of the blood. The assembly is capable of withstanding rough handling through the mails, inversion of the container without remixing the component phases and preventing various chemical constituents in the heavy phase from leaking into and mixing with the light phase or vice versa. It is also an object of the invention to provide an assembly which is adapted for use in conjunction with other blood sampling devices for obtaining samples to be centrifuged without the necessity of employing special equipment. Another object of the invention is to pass the light phase of the blood through a pressure responsive valve-like diaphragm which also serves as a filter. It is a further object of the invention to provide a self-contained assembly for separating blood into its component parts which is inexpensive to manufacture, simple to assemble and easy to use.

The separator assembly for separating blood into its component parts of plasma or serum, the light phase, and cellular portion, the heavy phase, is a self-contained unit which requires only that a sample of blood to be separated be provided within the container. The container is formed having at least one open end which is adapted to receive blood for separation into its component phases. A closure is mounted in the open end for sealing the container, this closure being formed of a self-sealing elastomeric material which is penetrable by a pointed hollow needle through which blood to be separated is conducted into the container. A piston is slidably mounted in the container having its outer cylindrical surfaces in sealing engagement with the inner surfaces of the container. Pressure responsive valve-like filter diaphragm means is disposed on said piston and normally closes off liquid flow when in a relased position or when there is a minimum of pressure differential on the two sides of the piston. The diaphragm automatically permits liquid flow in response to a substantial pressure differential so that when the container is subjected first to moderate centrifugal force, the blood separates into its light phase and heavy phase and when the centrifugal force is substantially increased thereafter the diaphragm automatically permits the light phase to pass through while the piston moves down through the light phase and the piston retains its sealing engagement with the inner surfaces of the container. A stop means is formed on the container and disposed a predetermined distance from the bottom of the container which is remote from the piston in its initial position so that the piston when moving through the light phase is caused to stop when it reaches the stop means; the pressure differential is terminated and the diaphragm automatically shifts from the open condition to the closed condition to provide a barrier between the separated light phase and heavy phase of the blood. Thereafter, the centrifuging is terminated and the separated sample is ready for shipment or transportation and subsequent testing.

BRIEF DESCRIPTION OF THE DRAWINGS

FIG. 1 is a sectional elevational view of the separator assembly illustrating a pointed cannula penetrating one of the closures through which blood is introduced into the container prior to separation; and FIG. 2 is a view similar to FIG. 1 illustrating the separation of the blood into the light phase and heavy phase with the piston and associated diaphragm passing through the light phase prior to reaching the stop means.

Detailed Description

The separator assembly 10 comprises a tubular member or container 12 having mounted in each of the open ends 11 and 15 closures 14 and 16, respectively. Closures 14 and 16 are made of a self-sealing elastomeric material such as rubber. Closure 16 is capable of being penetrated by cannula 18 for conducting blood into the container. When the cannula is removed, the closure reseals with no loss of blood.

Closure 14 is formed with a depending cylindrical body portion 20 and an integral flanged head portion 22. Body portion 20 has a diameter slightly greater than the internal diameter of the container 12 so that closure 14 when mounted into end 11 provides an interference fit to seal this end. Head portion 22 may be shaped in the form of a hexagon and is slightly greater in diameter than body portion 20 which permits the assembly to be positioned on its side without danger of rolling.

Stopper 16 has cylindrical body portion 28 and an integrally formed cylindrical head portion 30 having an axial recess 24'. Body portion 28 has an annular recess 29 to provide a self-sealing penetrable zone 31 to facilitate insertion of cannula or pointed hollow needle 18 with minimum force while maintaining a sealed closure. As noted above, stopper or closure 14 as well as 16 is inserted into ends 11 and 15 in compression to maintain ends 11 and 15 of the container 12 in sealed gas tight engagement.

Tubular member or container 12 is formed preferably of glass but any other suitable material may be employed. Intermediate ends 11 and 15 of tubular member 12 is an annular groove 32 forming a constriction and stop means 34 as a part of the inner surfaces of container 12. Thus, as piston 40 moves from the initial starting position illustrated in FIG. 1 to the terminal position after the separation of the light phase from the heavy phase the piston comes to rest at the stop means 34. It is not necessary to take special precautions concerning the density of the piston with respect to the density of the blood, provided the piston has substantially greater specific gravity, since the piston will automatically come to rest at stop means 34 when the increased centrifugal force is applied to the assembly. The seal of the piston with respect to the inner surface of the container is constant throughout its travel from its initial position of FIG. 1 to its terminal position.

The elastomeric portion of piston 40 comprises an outer wall 48 and spaced therefrom is inner wall 46 in which their respective wall surfaces define annular recess 54. Formed integrally with wall 48 are a plurality of radially spaced resilient sealing rings 50 which contact the inner wall surface 13 of container 12 in sealing engagement. Piston 40 when mounted in container 12 will maintain sealing contact with inner wall 13 of container 12 throughout its path of travel within container 12.

Piston 40 includes a tubular metal insert 52 which is mounted in annular recess 54 of piston 40. Metal insert 52 is preferably made of stainless steel or other rigid, chemically inert material having a specific gravity substantially greater than blood. Piston 40 is formed of elastomeric material and is provided with annular recess 54 which is dimensioned to receive tubular insert 52 in an interference fit so that no air space remains in annular recess 54.

A stretchable filter diaphragm 44 extends across the opening inside wall 46 of piston 40 and is suitably secured to the piston top end as for example by a suitable bonding agent or cement. Diaphragm 44 is preferably formed of microporous rubber which may be of the type supplied by Gottscho Stamp Company, Evans Terminal, Hillside, N.J. and created by S. C. Johnson & Son, Inc. This material when in a relaxed position is porous but the pore size is too small to permit liquid to pass therethrough, particularly the heavy phase of blood. When diaphragm 44 is stretched as a result of a pressure differential across both of its faces, the pores expand in size permitting the light phase to pass therethrough. When the travel of the piston 40 is interrupted by the stop means 34 the pressure differential will diminish sufficiently to cause the diaphragm 44 to return to its original relaxed condition, and thereafter it serves as a barrier against further liquid flow.

Thus, during the centrifuging operation when increased speed is used, piston 40 is subjected to centrifugal forces which start to move it downwardly. This movement establishes a pressure differential on the two sides of the top wall or diaphragam portion 44 of piston 40. Since the centrifugal force acting on piston 40 tending to move it downwardly will generate a hydrostatic force greater on the lower side of diaphragm 44 than exists on the upper side of diaphragm 44, the diaphragm will stretch and the pores will automatically increase in size enabling the light phase liquid to pass upwardly therethrough. Piston 40 will move from its initial postion of FIG. 1 to its terminal position while maintaining sealing engagement with the inner wall 13 of container 12. When piston 40 stops its movement in container 12 and comes to rest on stop means 34, the fluid pressure differential on the two sides of diaphragm 44 is substantially eliminated and the diaphragm 44 will assume its initial condition automatically closing off further liquid flow even though the assembly is still being subjected to centrifugal forces.

Piston 40 as noted above includes tubular insert 52 which is mounted in the annular recess 54 with an interference fit with no air space therearound. Also, when piston 40 is subjected to centrifugal forces the radial outward thrust force of the increased pressure of the liquid on interior surfaces of piston 40 is restrained by tubular insert 52 and will not be transmitted to resilient sealing rings 50 which would cause a major increase of friction between the piston 40 and the interior of glass tube 12 so that piston 40 may be prevented from sliding down to stop 34. Tubular insert 52 as noted above has such a specific gravity that it, plus the elastomeric piston together, have a specific gravity greater than blood and when subjected to centrifugal forces provide a large downward thrust, more than sufficient to overcome the friction of the multiple seal rings 50 of the piston relative to the glass tube plus the added work of stretching the diaphragm and enlarging its pores.

As indicated in the foregoing, the diaphragm 44 also functions as a filter to remove any fibrin or other undesired material and prevent it from passing into the separated light phase.

When operating the separator assembly of the invention herein it is preferred that the assembly be evacuated so that when cannula 18 penetrates closure 16 blood will fill container 12. It is also contemplated to provide a separator assembly suitable for use with the blood collecting assembly disclosed in U.S. Pat. Nos. 2,460,641; 3,469,572 and 3,494,352. It is important when filling the assembly 10 that blood be introduced into container 12 through the stopper 16 mounted on the bottom of the container to obviate the possibility of having blood cells trapped between the piston 40 and stopper 14 which will later separate to form the chamber where the light phase will be collected thus contaminating the light phase with blood. If the assembly is evacuated it is obvious blood will fill the space between closure 16 and the piston 40.

After cannula 18 is withdrawn and container 12 is filled with blood the assembly is placed in a centrifuge and the blood is separated initially employing moderate centrifugal forces which do not cause the piston to move from its initial position. This precipitates or separates the blood cells or blood clot into the tube portion below constriction stop means 34. Thereafter the rotational speed of the centrifuge is increased which causes a substantial downward thrust on the piston. As the piston starts to move it increases the hydrostatic pressure in the liquid ahead of it and stretches the diaphragm and its pores automatically enlarge and the piston moves downwardly with the light phase passing upwardly therethrough. Piston 40 maintains sliding and sealing engagement with the inner wall 13 of container 12. The piston completes its movement when it engages stop means 34 and terminates the pressure differential at the bottom and top of the diaphragm which then serves as a liquid barrier while the assembly is still subjected to centrifugal forces.

Then centrifugal forces are terminated and the separated blood sample is ready for use. As desired, the serum or plasma can be taken from one end and/or the concentrated red cells can be taken from the other end.

While variations of the invention herein may be had, the objectives of the invention have been illustrated and described.

We claim:

1. A self-contained fluid separator assembly, capable of separating blood into its component parts of plasma or serum and cellular portion, comprising:
   a. a container having open ends at least one of which is adapted to receive blood for subsequent separation into a light phase and a heavy phase;
   b. a removable closure sealing each open end of the container, the closures being formed of a self-sealing elastomeric material at least one of which is penetrable by a cannula through which blood to be separated is conducted into the container;
   c. a piston having a specific gravity relatively greater than the cellular portion of the blood and slidably mounted in the container and having means on an outer surface for providing sealing engagement with an inner surface of the container said sealing means being further constructed and arranged to maintain the piston substantially stationary when subjected to a moderate centrifugal force and to permit the piston to move when subjected to a substantially greater centrifugal force;
   d. pressure responsive stretchable filter diaphragm means having micro pores therein and being associated with said piston, said diaphragm means being constructed and arranged to normally close off all liquid flow through its pores when there is a minimum of pressure differential on each side thereof and which automatically stretches to enlarge its pores in response to a substantial pressure differential so that when said container is subjected to said moderate centrifugal force the blood separates into its light phase and heavy phase but the piston stays in the upper portion of the container, and subsequently when subjected to said substantially greater centrifugal force, the pores of the diaphragm means automatically enlarge to allow only the light phase to pass therethrough while enabling the piston to move down through the light phase while retaining sealing engagement with the inner surfaces of the container; and
   e. mechanical stop means on the container whereby the piston when moving through the light phase will stop a predetermined distance from one of the ends of the container followed by termination of the differential pressure which permits the diaphram means to automatically shift to its initial condition at which it provides a barrier between the separated light phase and heavy phase of the blood.

2. The self-contained fluid separator of claim 1 wherein the piston includes a rigid tubular sleeve mounted in a generally tubular outer body portion formed of an elastomer and having at least one sealing ring on its outer portion for sealing engagement with the inner walls of the container.

* * * * *